March 3, 1964     C. A. DAWSON ETAL     3,122,830
METHOD FOR FORMING AN INTEGRAL FLANGE ON A METAL TUBE
Filed June 8, 1959     2 Sheets-Sheet 2

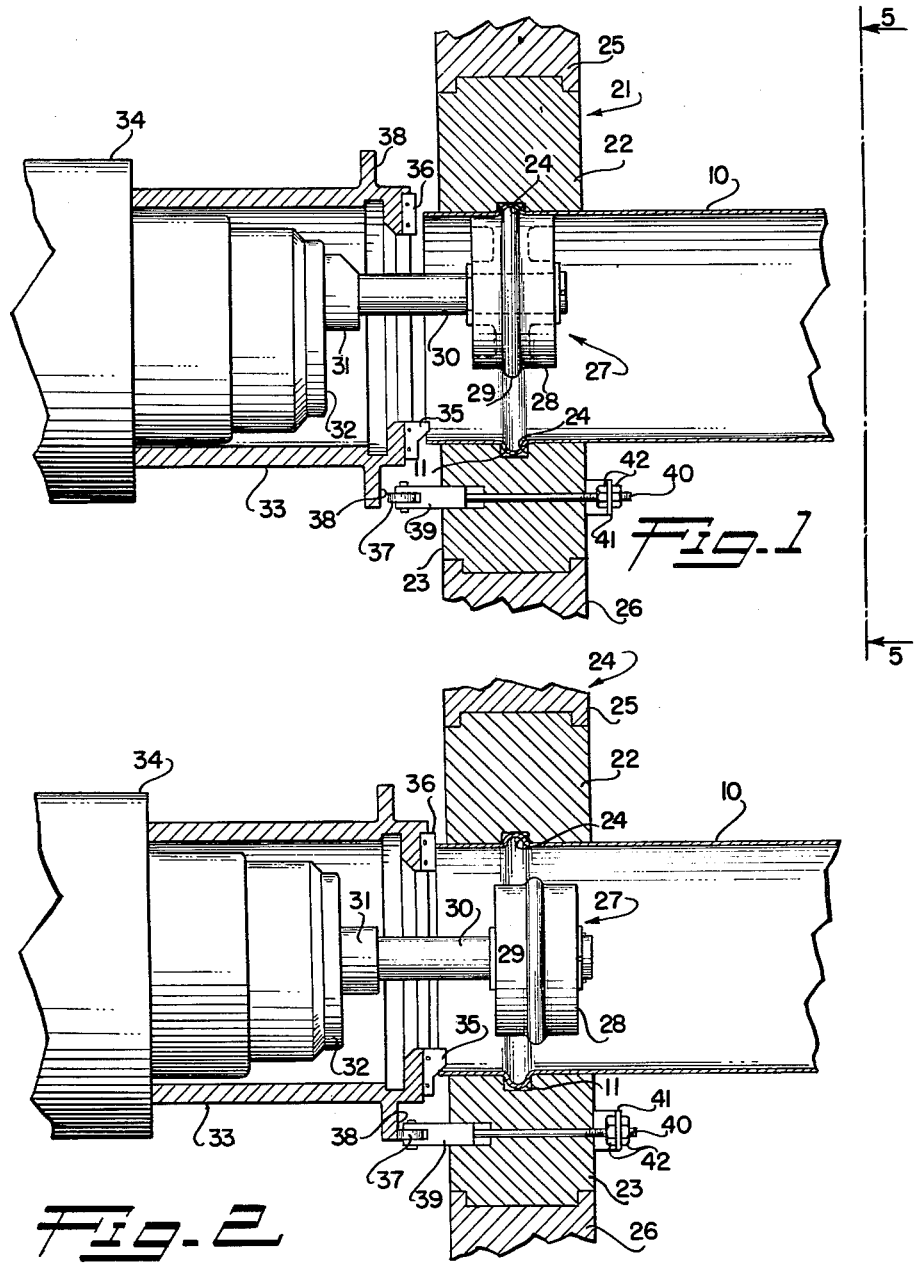

INVENTORS
CHARLES A. DAWSON
RAYMOND W. ROSS

By *George C. Sullivan*
Agent

United States Patent Office 3,122,830
Patented Mar. 3, 1964

3,122,830
METHOD FOR FORMING AN INTEGRAL FLANGE ON A METAL TUBE
Charles A. Dawson, Sylmar, and Raymond W. Ross, Burbank, Calif., assignors to Lockheed Aircraft Corporation, Burbank, Calif.
Filed June 8, 1959, Ser. No. 818,776
4 Claims. (Cl. 29—542)

This invention relates to a method of providing means for end to end coupling of lengths of tubing; more particularly the invention relates to a method of forming flanges on the ends of metal tubing which will be connected end to end or face to face for sealing purposes. Specifically, it relates to a method of forming an integral flange or a flange made in the tubing material itself.

One of the most prevalent means of connecting the end of one tube to the end of the next tube is to provide surfaces around the terminal circumference of the ends of the tubes in a plane perpendicular to their axes, then clamping those surfaces together to form a seal. The most common means of accomplishing this is to provide a flange at the end of the tube which carries the sealing surface. The surface which provides the area to be engaged with the like surface on a connecting tube must of necessity be tight, especially when the tubing is used as air ducting, such as in pressurization systems of aircraft. It has been found that an efficient airtight connection can be created without the use of gaskets or additional sealing material by using a flange which flares sharply away from the tube exterior at its end then returns sharply with a terminal diameter slightly larger than the interior diameter of the tube. This provides a resilient end base in a plane substantially perpendicular to the end axis of the tube. When coupled with a like surface on another tube end by means of a clamp an airtight seal is created. The flange described above has to date been constructed separately, then attached to the tube, usually by welding. The flange is constructed with a sleeve which has an inside diameter approximately equal to the exterior diameter of the tube to which it is to be attached. The sleeve is fitted over the tube and roll-welded. This creates a lap joint which adds weight and is therefore undesirable, especially when used in aircraft, as suggested above. A further disadvantage is that the heat of welding tends to warp the sealing surface causing leakage, particularly on thin-walled tubing.

Close tolerances must be met in order that the sealing surface mate exactly with the sealing surface with which it is to be connected. Meeting these tolerances becomes especially difficult when the flange is to be placed close to a bend in the tube. Accordingly expensive jigs and tools are required in welding the flange sleeve to the tube.

To overcome the difficulties of welding a flange sleeve on a tube, several attempts have been made for construction of an integral flange with varying degrees of success. The major problem encountered has been to secure the tube against movement while the flange is being formed. Tremendous pulling forces are exerted during the forming. Any movement at all throws the resulting sealing surface out of alignment and the required close tolerances are thus not met.

It is a general object of this invention to provide a method by which a flange of the character referred to may be formed integrally on a tube.

It is another object of this invention to provide an inexpensive method of forming an integral flange on a tube while maintaining a degree of accuracy comparable to that obtained by the use of expensive jigs and fixtures in accordance with the conventional practice of welding a flange sleeve on a tube.

It is still another object of this invention to provide a method by which a flange may be formed upon a tube at a savings in weight. A lap seam and weld are eliminated.

Another object of this invention is to provide a method by which a tube may be held rigidly while a flange of the character referred to is formed on its end.

Other objects and features of the invention will be readily understood from the following detailed description of a typical preferred form of the invention wherein reference will be made to each of the accompanying drawings in which:

FIGURE 1 is a view taken on line 1—1 of FIGURE 5 showing the beading operation with certain parts appearing in side elevation;

FIGURE 6 shows the manner in which the method of the present invention will be utilized.

Figure 3:
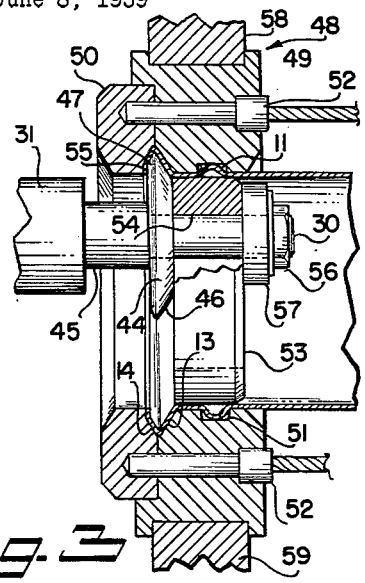
FIGURE 3 is a view taken on a line similar to 1—1 on FIGURE 5 but with a flanging roller and die shown.
Figure 4:
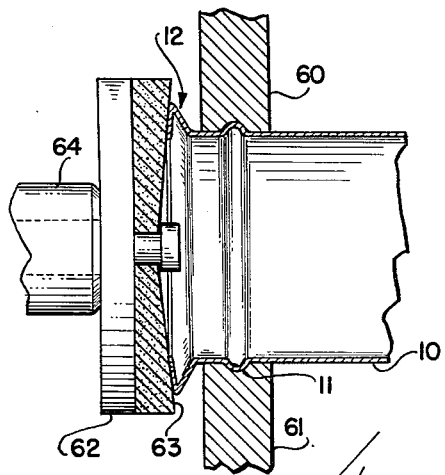
FIGURE 4 shows the final grinding operation on a similar cross section.
Figure 2:
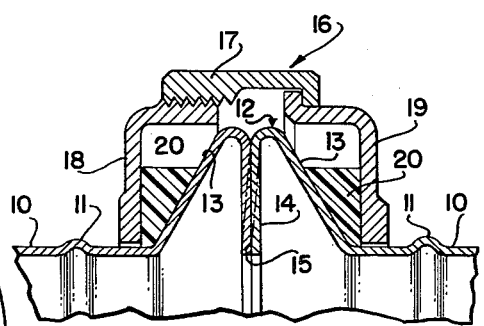
FIGURE 2 is a similar view to that taken on line 1—1 of FIGURE 5 showing the operation of trimming the tube subsequent to beading.

The major problem involved with forming an integral flange on a tube is that it tends to slip longitudinally during forming, thus throwing the resulting flange out of alignment. As stated above, close tolerances are required when the tubes must fit end to end. Thus the method involved in this invention involves providing means by which the tube may be held during the flanging operation. FIGURE 1 shows the forming of a bead by which the tube will be held. FIGURE 2 shows generally the trimming of that tube with relation to that bead within the tolerances required. FIGURE 3 then shows the flaring or flanging operation and FIGURE 4 shows, generally, grinding of a sealing face on the resulting flange.

The product resulting from the method of this invention is used as shown in FIGURE 6 wherein each tube 10 has an end flange 12 which has a sealing lip 14 of which the outside sealing surface 15 mates with a like tube having a flange 12 and a like sealing surface 15. Two tubes are butted end to end with sealing surfaces 15 facing each other. Note that they are slightly flared outwardly so that when pressed together they will mate exactly in a plane perpendicular to the axis of the tubes. These flanges are held together by means of a clamp. Clamp 16, shown as an example, is comprised of a ring 17 which holds two clamp halves 18 and 19 together which exert inward pressure upon wedge inserts 20 and in turn the flanges through clamp surfaces 13, thereby insuring a tight fit between sealing surfaces 15. Ring 17 and clamp halves 18 and 19 extend around the circumference of the tube at the flanges at the junction of the tubes. It has been found that pressing two sealing surfaces 15 together in such a manner provides an efficient airtight connection.

The beading operation is accomplished by means of beading die 21 and beading roller 27 shown in FIGURE 1. The beading roller 27 is rolled around the interior of the beading die opposite a recess 24 on its interior. With tube 10 interposed the tube wall is pressed outwardly by the beading roller.

The beading die 21 is split in an axial plane forming two halves 22 and 23. The upper half 22 and lower half 23 can clearly be seen in FIGURE 5. Upper jaw 25 and lower jaw 26 are hinged together at a point, not shown, with die halves 22 and 23 fixed to jaw 25 and jaw 26 respectively so that the insertion and removal of tube 10 is facilitated. The beading roller is comprised of a cylinder 28 having a raised beading area 29 mounted for free rotation on shaft 30. Shaft 30 is integral with arbor 31 which is mounted upon adapter 32, in turn carried by machine spindle 34, both of which rotate on a fixed axis. However, arbor 31 is carried so that it may be eccentrically moved away from the axis of adapter 32 by remote controls, not shown here. During the beading operation, tube 10 is inserted into the die with the beading roller in the center position, and machine spindle 34 is then rotated and arbor 31 moved eccentrically. The beading surface 29 engages the interior of tube 10 adjacent recess 24 and freely turns around inside of the tube forcing a portion of the tube into the recess 24 thus creating an exterior bead 11 on tube 10. When some types of stainless steel are used as tubing, then an annealing operation, not shown here, is necessary before the original beading operation so as to allow forming of the beading.

Figure 5:
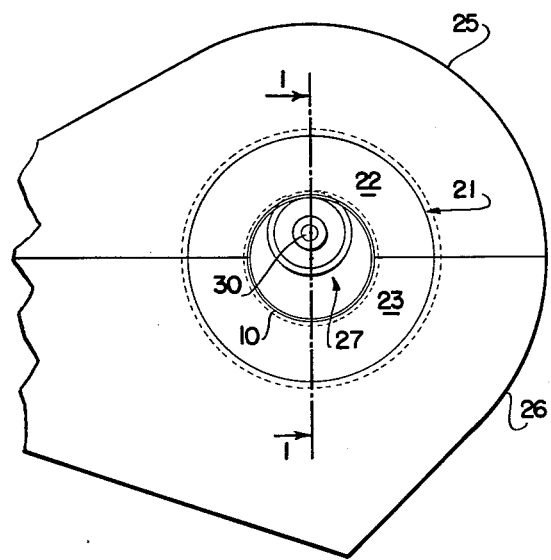
FIGURE 5 shows the beading operation from the end elevation taken on line 5—5 of FIGURE 1.

FIGURE 5 shows, generally, the beading operation from an end view taken on lines 5—5 of FIGURE 1. It can be clearly seen here that the beading roller 27 rotates within the beading die 21 thereby forcing outwardly the wall of tube 10. It can be seen that as shaft 30 is rotated clockwise, the roller 27 is rotated counter-clockwise on the shaft 30 since roller 27 is mounted for free rotation on shaft 30.

In this beading operation the tube is inserted into die 21 (toward the left as seen in FIGURE 1) a slight bit more than is necessary. In the next operation, shown in FIGURE 2, the tube is trimmed to an exact distance from the bead. After the bead has been formed in the tube by beading roller 27 the machine spindle 34 is moved toward the die until adjustable stop roller 37 engages stop 38. Stop 38 is carried on burring head 33 which is mounted rigidly on machine spindle 34, thus when machine spindle 34 rotates so does burring head 33. Adjustable roller 37 is carried by yoke 39 on a bolt 40 which in turn is mounted in a cylindrical bore through die 21 and adjustably mounted on bracket 41 on die 21 by means of adjusting nuts 42 whereby the distance away from die 21 that roller 37 is fixed can be adjusted through means of nuts 42 on bolt 40. Die 21 is moved toward machine spindle 34 carrying tube 10 with it until roller 37 contacts stop 38. During this movement, cutter 36 and the burring tool 35 are in contact with the end of the tube and in the rotation shear off and burr the interior of the tube an exact distance from the bead, determined by the stop roller setting. This insures that the resulting flange that comes in the next operation will be terminated within the exact tolerances, to be later described.

FIGURE 3 shows the flanging operation itself which is similar in nature to the beading operation. The wall of the tube is forced outwardly by a tool to form the flange in much the same manner as the beading operation. The flanging roller 44, freely mounted on shaft 30, is rotated in the same manner that beading roller was rotated. Flanging die 48 is comprised in this example of flare die 49 and mating flare die insert 50. Flanging roller 44 cooperates with die 48 to form the flange. It has been found that by heating the tube the flaring operation is made much easier and much simpler. Therefore, heating elements 52 in the die 48 are utilized to provide heat during the flaring or flanging operation.

In this operation previously formed bead 11 is used to secure the tube against movement. Note that flare die 49 has a recess 51 in which the bead 11 is held, thus preventing any endwise or longitudinal movement of the tube. Because of the extreme nature of the forming in the flange there are tremendous pulling forces on the tube while the flange is being formed by roller 44. The mating of bead 11 and recess 51 in flare die 49 prevents this longitudinal movement or slippage during the pulling forces of flanging. The flanging roller 44 has a flare surface 46 and a flare surface 47 which creates the flare outwardly from the tube and then back inwardly on the flange itself. For some types of tube material, it has been found necessary to provide flare surface 47 with an additional annular flare surface 55 which lies closer than surface 47 to a plane perpendicular the axis of the tube. The extreme edge of lip 14 has a tendency to spring outwardly, resulting in a distorted sealing area. Surface 55 on flanging roller 44 counteracts this tendency by forcing the extreme edge of lip 14 inwardly so that when it springs outwardly upon removal from die 48, lip 14 will be straight from the outer diameter of the flange to the extreme edge. Mandrel 53 has an axial bore 54 larger than the diameter of shaft 30 on which it is mounted to allow for eccentric motion of the shaft. Spacer-washer 57, retained on shaft 30 by nut 56, allows this movement and maintains mandrel 53 in position. The purpose of mandrel 53 is to prevent the bead 11 from slipping out of recess 51 due to the extreme forces exerted in the flanging operation. Note that flanging die 48 is held rigidly in jaws 58—59. Flanging roller 44 is mounted in arbor 31 in the same equipment as shown in FIGURE 1, thus the eccentricity of arbor 31 and likewise shaft 30 and flanging roller 44 can be remotely controlled so that flanging roller 44 may be inserted into the tube, moved to an eccentric position, then rotated around the interior of the tube. As flanging roller 44 rotates inside tube 10, the clamping surface 13 is stretched outwardly and the sealing lip 14 is pulled or stretched inwardly. After the flanging is complete arbor 31 is returned to its center position. Jaws 58—59 on which flanging die 48 is located are opened and the tube is removed. Flanging die 48 is split in a manner similar to beading die 21.

Tube jaws 60—61 in FIGURE 4 are shown holding the tube for the next operation, the grinding of the sealing surface 15. In order that sealing surfaces 15 form an airtight fit, the skin must be ground away slightly. This grinding is performed by concave grinder 62 on which is mounted a lapping disc 63 which is rotated on a variable center against the sealing surface 15 while it is being held in tube jaws 60—61. It has been found that nothing more than a light skin cut is needed to form a tight sealing surface.

In reviewing the operation of the device which effects the method of the present invention, it will be seen that the first step is to bead the tube 10 by means of roller 27 in die 21. The second step is to trim tube 10 by means of cutters 36 and burrer 35. Tube 10 is then removed from die 21, placed in the flanging die 48 for the flanging operation which is done in a manner similar to the beading operation by roller 44, the tube being held rigidly by means of bead 11 fitting in recess 51. The last step is the grinding of the sealing surface 15.

Having described only a typical form of the invention we do not wish to be limited to the specific details herein set forth but wish to reserve to ourselves any variations or modifications that may appear to those skilled in the art or fall within the scope of the following claims.

What is claimed is:

1. A method of forming an integral circumferential flange on the end of a stainless steel tube comprising the steps of heat annealing the end of the tube on which the flange is to be formed, forming a continuous circumferential exterior bead near the end, gripping the tube rigidly by means of the bead, applying the heat to the end area, rolling a flange on the end so that there is a face substantially perpendicular to the axis at the end of the tube, and grinding the face smooth.

2. A method of forming an integral flange on a stainless steel tube comprising the steps of heat annealing the portion of said tube to be formed, forming a circumferential bead near the end on which the flange is to be formed, securing the tube against movement by gripping said bead, forming an outward circumferential flare of less than 90° from the longitudinal tube axis in the wall of the tube between said bead and said end and an inwardly directed portion between said outward flare and said end so that said end terminates in spaced relation from said outward flare with a diameter approximately equal to the diameter of said tube, and is adapted to be spring biased for sealing effectiveness.

3. A method of forming an integral end flange on a stainless steel tube comprising the steps of annealing the end of said tube in the region to be formed, rolling a continuous circumferential exterior bead into the wall of said tube near the tube end on which the flange is to be formed, securing said tube against movement by gripping said bead, cutting the peripheral edge of the end of the tube a uniform distance from said bead, heating said end, rolling an outward flare of less than 90° in said tube wall between said bead and said terminal end and rolling an inwardly directed flare between said outward flare and said terminal end.

4. A method for forming an integral flange on a stainless steel tube comprising the steps of annealing the portion of said tube to be formed, forming tube securing means in the tube, rigidly securing the tube by said means, applying heat to the tube, simultaneously rolling first and second continuous circumferential flare portions on the tube and in spaced relation from the securing means such that said first portion extends from the tube at an acute angle to the tube axis and away from the securing means and the second portion extends flexibly inward from the first portion at an acute angle from the tube axis and a free end of the second portion terminates in spaced relation from the nonflared portion of the tube, and grinding a smooth contact face upon the outer extremity of the second portion, said second portion adapted to be spring biased for sealing effectiveness.

References Cited in the file of this patent

UNITED STATES PATENTS

| | | |
|---|---|---|
| 893,434 | Brinkman | July 14, 1908 |
| 1,952,857 | Grotnes | Mar. 27, 1934 |
| 2,356,457 | Gonda | Aug. 22, 1944 |
| 2,427,026 | Smith | Sept. 9, 1947 |